US009650290B2

(12) United States Patent
Vikor et al.

(10) Patent No.: US 9,650,290 B2
(45) Date of Patent: May 16, 2017

(54) IG WINDOW UNIT FOR PREVENTING BIRD COLLISIONS

(71) Applicant: Centre Luxembourgeois de Recherches pour le Verre et la Ceramique (C.R.V.C.) SaRL, Dudelange (LU)

(72) Inventors: Gyorgy Vikor, Oroshaza (HU); Bernd Disteldorf, Mettlach (DE)

(73) Assignee: Centre Luxembourgeois de Recherches pour le Verre et la Ceramique (C.R.V.C.) SaRL, Dudelange (LU)

( * ) Notice: Subject to any disclaimer, the term of this patent is extended or adjusted under 35 U.S.C. 154(b) by 287 days.

(21) Appl. No.: 14/287,382

(22) Filed: May 27, 2014

(65) Prior Publication Data

US 2015/0345206 A1    Dec. 3, 2015

(51) Int. Cl.
| | |
|---|---|
| *E06B 3/66* | (2006.01) |
| *C03C 17/34* | (2006.01) |
| *A01M 29/08* | (2011.01) |
| *C03C 17/36* | (2006.01) |
| *E06B 3/67* | (2006.01) |

(52) U.S. Cl.
CPC ......... *C03C 17/3435* (2013.01); *A01M 29/08* (2013.01); *C03C 17/3417* (2013.01); *C03C 17/36* (2013.01); *C03C 17/366* (2013.01); *C03C 17/3644* (2013.01); *C03C 2217/734* (2013.01); *C03C 2218/365* (2013.01); *E06B 3/66* (2013.01); *E06B 3/6612* (2013.01); *E06B 3/67* (2013.01); *E06B 3/6715* (2013.01)

(58) Field of Classification Search
CPC . E06B 3/66; E06B 3/6612; E06B 3/67; E06B 3/6715; A01M 29/08; C03C 17/3417; C03C 17/3435; C03C 17/36; C03C 17/3644; C03C 2218/365; C03C 2217/734
See application file for complete search history.

(56) References Cited

U.S. PATENT DOCUMENTS

| | | | |
|---|---|---|---|
| 5,784,853 | A | 7/1998 | Hood et al. |
| 5,800,933 | A | 9/1998 | Hartig et al. |
| 6,014,872 | A | 1/2000 | Hartig et al. |
| 6,632,491 | B1 | 10/2003 | Thomsen et al. |

(Continued)

FOREIGN PATENT DOCUMENTS

| | | | |
|---|---|---|---|
| EP | 1942356 | * | 10/2006 |
| GB | 2506034 | * | 3/2014 |

OTHER PUBLICATIONS

U.S. Appl. No. 13/766,025, filed Feb. 13, 2013; Vikor.
U.S. Appl. No. 13/716,320, filed Dec. 17, 2012; Theios.
U.S. Appl. No. 14/030,076, filed Sep. 18, 2013; Vikor.

*Primary Examiner* — Donald J Loney
(74) *Attorney, Agent, or Firm* — Nixon & Vanderhye P.C.

(57) ABSTRACT

This invention relates to a window designed to prevent or reduce bird collisions therewith. In certain example embodiments, the window may include an insulating glass (IG) window unit having first and second substrates spaced apart from one another, wherein at least one of the substrates supports an ultraviolet (UV) reflecting coating for reflecting UV radiation so that birds are capable of more easily seeing the window. By making the window more visible to birds, bird collisions and thus bird deaths can be reduced.

22 Claims, 3 Drawing Sheets

(56) References Cited

U.S. PATENT DOCUMENTS

| | | |
|---|---|---|
| 8,114,488 B2 | 2/2012 | Alvarez |
| 2004/0258947 A1 | 12/2004 | Moelle et al. |
| 2007/0188871 A1* | 8/2007 | Fleury ............... B32B 17/10036 359/586 |
| 2009/0047487 A1* | 2/2009 | Klem, Jr. .............. A01M 29/06 428/210 |
| 2013/0087720 A1* | 4/2013 | Cesnik .................. A01M 29/08 250/461.1 |

* cited by examiner

IG WINDOW UNIT FOR PREVENTING BIRD COLLISIONS

This invention relates to an insulating glass (IG) window unit designed to prevent or reduce bird collisions therewith. The IG window unit includes at least first and second substrates (e.g., glass substrates) spaced apart from one another, wherein at least one of the substrates supports an ultraviolet (UV) reflecting coating for reflecting UV radiation so that birds are capable of more easily seeing the window. By making the window more visible to birds, bird collisions and bird deaths can be reduced. The UV reflecting coating may be patterned in certain example embodiments.

BACKGROUND OF THE INVENTION

IG window units are known in the art. For example, see U.S. Pat. Nos. 6,632,491; 6,014,872; 5,800,933; 5,784,853; 5,557,462; 5,514,476; 5,308,662; 5,306,547; and 5,156,894, all of which are hereby incorporated herein by reference. An IG window unit typically includes at least first and second substrates spaced apart from one another by at least one spacer and/or seal. The gap or space between the spaced apart substrates may or may not be filled with a gas (e.g., argon) and/or evacuated to a pressure less than atmospheric pressure in different instances.

Many conventional IG window units include a solar management coating (e.g., multi-layer coating for reflecting at least some infrared radiation) on an interior surface of one of the two substrates. Such IG units enable significant amounts of infrared (IR) radiation to be blocked so that it does not reach the interior of the building (apartment, house, office building, or the like).

Unfortunately, bird collisions with such windows represent a significant problem. For instance, in Chicago certain buildings (e.g., skyscrapers) are located in migratory bird paths. Birds flying along these paths repeatedly run into these buildings because they cannot see the windows of the building. This results in thousands of bird deaths, especially during seasons of bird migration. Birds living in environments such as forests or park areas, with buildings located in such areas, face similar problems associated with flying into the buildings.

Conventional ways of reducing bird collisions with windows include the use of nets, decals, or frit. However, these solutions are considered ineffective because of the aesthetic impact on the architecture and/or because they do not work as they do not make the glass more visible to birds.

U.S. Pat. No. 8,114,488 discloses a window for preventing bird collisions. However, while the window of the '488 patent is effective for preventing/reducing bird collisions, there is room for improvement.

In view of the above, it will be appreciated that there exists a need in the art for improved windows which can prevent or reduce bird collisions therewith.

BRIEF SUMMARY OF THE INVENTION

In certain example embodiments of this invention, a window is designed to prevent or reduce bird collisions therewith. In certain example embodiments, the window may comprise an insulating glass (IG) window unit. In IG window unit embodiments, the IG window unit includes first and second substrates (e.g., glass substrates) spaced apart from one another, wherein at least one of the substrates supports ultraviolet (UV) reflecting coating for reflecting UV radiation so that bird are capable of more easily seeing the window. By making the window more visible to birds in such a manner, bird collisions and thus bird deaths can be reduced.

In certain example embodiments, there is provided an IG window unit comprising: a first glass substrate; a second glass substrate spaced apart from the first glass substrate; a UV reflecting coating provided on the first glass substrate and on an exterior surface of the IG window unit so as to face an exterior of a building in which the IG window unit is to be mounted; a low-E coating provided on the other side of the first glass substrate, so that the first glass substrate supports and is located between the UV reflecting coating and the low-E coating; wherein the UV reflecting coating is not part of a low-E coating and does not contain any IR reflecting layer of silver or gold; wherein the UV reflecting coating is patterned so that the UV reflecting coating is not provided continuously across the entire first substrate; wherein the UV reflecting coating comprises first, second, third, and fourth layers in this order moving away from the first glass substrate, and wherein the first and third layers are high index layers having a refractive index of at least about 2.25 and the second and fourth layers are low index layers having a refractive index of no greater than 1.8, where refractive indices are measured at 550 nm; wherein the first, second, third and fourth layers are each dielectric layers that are substantially transparent to visible light; and wherein the IG window unit has a visible transmission of at least about 50%, and the UV reflecting coating reflects at least 40% of UV radiation in at least a substantial part of the range from 300-400 nm.

DETAILED DESCRIPTION OF EXAMPLE EMBODIMENTS OF THE INVENTION

Referring now more particularly to the accompanying drawings in which like reference numerals indicate like parts throughout the several views.

The difference between color vision of a bird and human is significant. A bird's visual receptor may be around 370 nm which means that birds can generally see efficiently in the UV range. Using this difference, it is possible to make a coating that efficiently reflects UV (making it visible to birds) while being substantially neutral/invisible to human eyes.

A window is designed to prevent or reduce bird collisions therewith. In certain example embodiments, the window may comprise an insulating glass (IG) window unit, or alternatively a monolithic window. In IG window unit embodiments, the IG window unit includes first and second substrates (e.g., glass substrates) spaced apart from one another, wherein at least one of the substrates supports ultraviolet (UV) reflecting coating for reflecting UV radiation so that bird are capable of more easily seeing the window. In preferred embodiments, the window is made more visible to birds by providing the UV reflecting coating on an exterior exposed surface of the IG window unit so that it is exposed to the ambient atmosphere outside the building on which the window unit is mounted. By making the window more visible to birds in such a manner, bird collisions and thus bird deaths can be reduced. In IG window unit embodiments, first and second spaced apart substrates are separated from one another by at least one seal and/or spacer. In certain example embodiments, the first substrate supports a solar management coating (e.g., low-E coating) for blocking at least some infrared (IR) radiation and a UV reflecting blocking coating for reflecting UV radiation to make the window more visible to birds in order to reduce collisions. In certain example embodiments, the low-E coating may have an emissivity ($E_n$) of no greater than 0.10 and/or a sheet resistance ($R_s$) of no greater than 8 ohms/square. In certain example embodiments, the UV reflecting coating may block at least 38% (more preferably at least 40%, more preferably at least 55%, even more preferably at least 60%, and possibly at least 65%) of UV radiation in at least a substantial part of the range from 350 to 440 nm (or alternatively in a substantial part of the range from 300-400 nm). This is significant UV blockage/reflection, and represents a significant advantage over coatings described in U.S. Pat. No. 8,114,488. This increases the UV reflection of the window unit intended for commercial or residential applications in order to make such windows more visible to birds thereby preventing or reducing bird collisions. The use of such coatings herein enhances the performance of the glass or window by increasing the UV reflectance beyond the normal limits of raw uncoated plate glass in the 300-440 nm range of the spectrum. In certain example embodiments, the UV reflecting/blocking coating may be patterned (e.g., in a grid pattern or in a parallel striped pattern) on the window unit which can make it even more visible to birds to further reduce bird collisions. Moreover, the IG window unit preferably has a visible transmission of at least about 50%, more preferably of at least about 60%, and even more preferably of at least about 65% or at least about 70%. Monolithic coated articles having only the coating 150 on a glass substrate 1 may have: (a) a visible transmission of at least about 70%, more preferably of at least about 80%, and even more preferably of at least about 85%, (b) the film side UV reflectance of at least 38% (more preferably at least 40%, more preferably at least 55%, even more preferably at least 60%, and possibly at least 65%), and (c) a film side visible reflectance of less than about 20%, more preferably less than about 15%, and most preferably less than about 10%. Thus, the film side UV reflectance may be at least about 4 times higher than the film side visible reflectance of the monolithic coated article (more preferably at least about 5 times higher, even more preferably at least about 8 times higher, and possibly at least 10 times higher).

Figure 1:
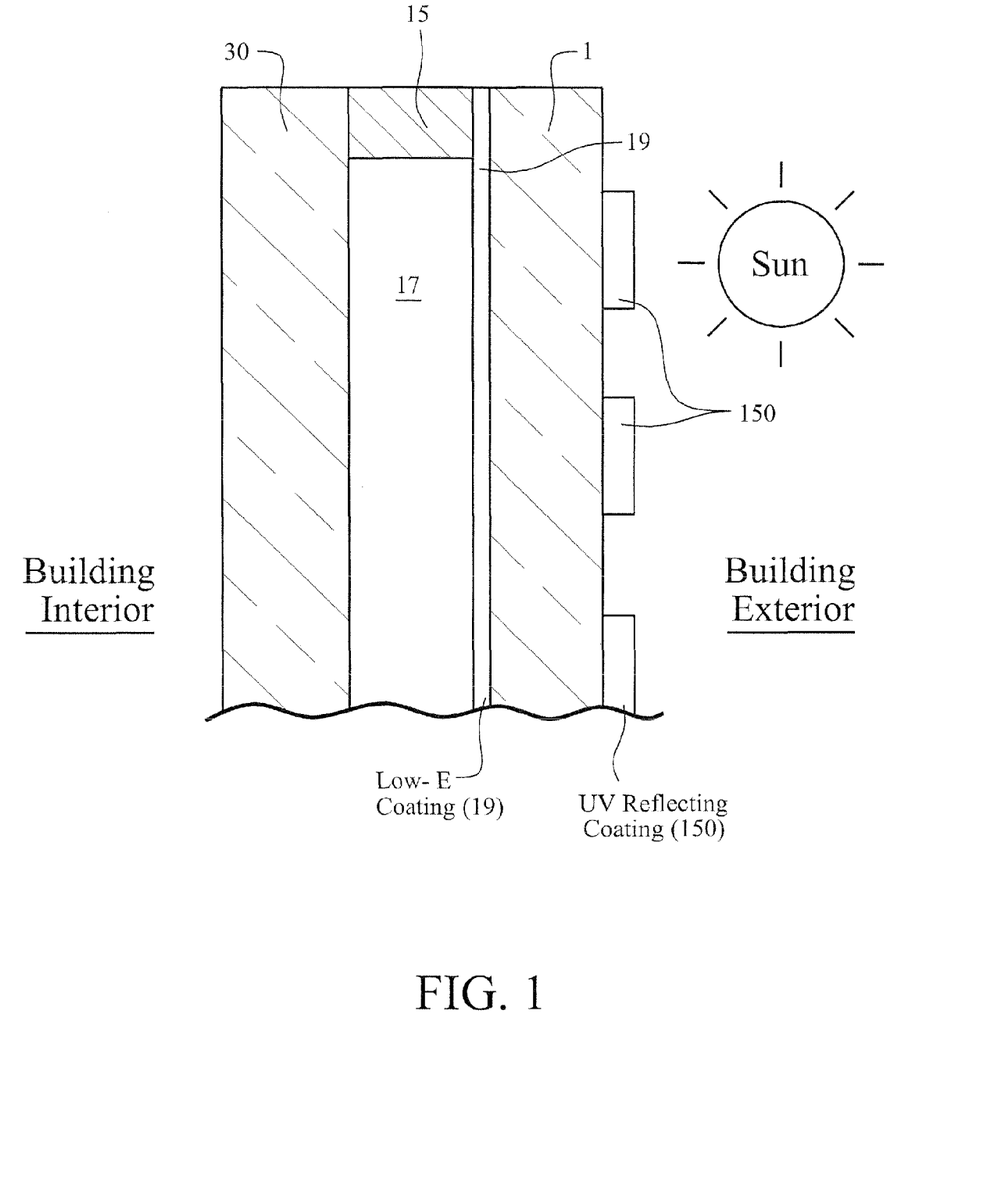
FIG. 1 is a cross sectional view of an IG window unit according to an example embodiment of this invention.

FIG. 1 is a cross sectional view of a portion of an IG window unit according to an example embodiment of this invention. As shown in FIG. 1, the IG window unit includes first substrate 1 and second substrate 30 that are spaced apart from one another at least by one or more peripheral seal(s) or spacer(s) 15. Optionally, an array of spacers (not shown) may be provided between the substrates in a viewing area of the window for spacing the substrates from one another as in the context of a vacuum IG window unit. The spacer(s) 15, other spacer(s), and/or peripheral seal space the two substrates 1 and 30 apart from one another so that the substrates do not contact one another and so that a space or gap 17 is defined therebetween. The space 17 between the substrates 1, 30 may be evacuated to a pressure lower than atmospheric in certain example embodiments, and/or may be filled with a gas (e.g., Ar) in certain example embodiments. Alternatively, space 17 between the substrates 1, 30 need not be filled with a gas and/or need not be evacuated to a low pressure. In certain example embodiments, it is possible to suspend foil or other radiation reflective sheet(s) (not shown) in space 17. When substrate(s) 1 and/or 30 are of glass, each glass substrate may be of the soda-lime-silica type of glass, or any other suitable type of glass, and may be for example from about 1 to 10 mm thick in certain example embodiments of this invention.

The IG window unit of FIG. 1 may include a solar management coating 19 (e.g., low-E coating) that is supported on an interior surface of substrate 1. Low-E coating 19 includes one or more layers, although in many embodiments it is a multi-layer coating. Low-E coating 19 includes at least one IR reflecting layer (e.g., based on silver or gold) sandwiched between at least first and second dielectric layers. Since one example function of low-E coating 19 is to block (i.e., reflect and/or absorb) certain amounts of IR radiation and prevent the same from reaching the building interior, the solar management coating 9 includes at least one IR blocking (i.e., IR reflecting and/or absorbing) layer. Example IR blocking layer(s) which may be present in coating 19 are of or include silver (Ag), nickel-chrome (NiCr), gold (Au), and/or any other suitable material that blocks significant amounts of IR radiation. It will be appreciated by those skilled in the art that IR blocking layer(s) of low-E coating 19 need not block all IR radiation, but only need to block significant amounts thereof. In certain embodiments, each IR blocking layer of coating 19 is provided between at least a pair of dielectric layers. Example dielectric layers include silicon nitride, titanium oxide, silicon oxynitride, tin oxide, and/or other types of metal-oxides and/or metal-nitrides. In certain embodiments, in addition to being between a pair of dielectric layers, each IR blocking layer may also be provided between a pair of contact layers of or including a material such as an oxide and/or nitride of nickel-chrome or any other suitable material. Example low-E coatings 19 which may be provided on substrate 1 are described in U.S. Pat. Nos. 7,267,879, 6,576,349, 7,217,461, 7,153,579, 5,800,933, 5,837,108, 5,557,462, 6,014,872, 5,514,476, 5,935,702, 4,965,121, 5,563,734, 6,030,671, 4,898,790, 5,902,505, 3,682,528, all of which are hereby incorporated herein by reference. Of course, solar management coatings 19 herein are not limited to these particular coatings, and any other suitable solar management coatings capable of blocking amounts of IR radiation may instead be used. Solar management coatings 19 herein may be deposited on substrate(s) 1 and/or 30 in any suitable manner, including but not limited to sputtering, vapor deposition, and/or any other suitable technique.

Still referring to FIG. 1, the IG window unit further includes UV reflecting coating 150 for reflecting significant amounts of UV radiation thereby making the window more visible to birds. Coatings 150 may be sputter-deposited in example embodiments of this invention. UV reflecting coating 150 may be, for purposes of example and without limitation, any of the UV reflecting coatings illustrated in FIGS. 2-6. This increases the UV reflection of the window unit in order to make such windows more visible to birds thereby preventing or reducing bird collisions. The use of such coatings 150 herein enhances the performance of the glass or window by increasing the UV reflectance beyond the normal limits of raw uncoated plate glass in the 300-440 nm range of the spectrum. In certain example embodiments, the UV reflecting coating 150 is in direct contact with the glass substrate 1 on the exterior surface thereof, and is not part of a low-E coating 19. In particular, there are no IR reflecting layers (e.g., silver based, gold based, NiCr, or IR reflecting TCO-based layers) in coating 150, and there are no IR reflecting layers on the side of the substrate 1 on which the coating 150 is provided. Instead, any low-E coatings (e.g., see low-E coating 19) may be provided on the other side of substrate 1 from coating 150 or alternatively on the surface of glass substrate 30 that faces gap 17. In certain example embodiments, the UV reflecting coating 150 may block at least 38% (more preferably at least 40%, more preferably at least 55%, even more preferably at least 60%, and possibly at least 65%) of UV radiation in at least a substantial part of the range from 350 to 440 nm (or alternatively in a substantial part of the range from 300-400 nm).

The UV reflecting coating 150 may be patterned (e.g., in the shape of a grid or in substantially parallel or non-parallel stripes) on the surface of substrate 1 as shown in FIG. 1, or alternatively may be provided continuously across substantially the entire surface of substrate 1 in other embodiments. The patterned shape of coating 150 may be formed as follows. A pattern (not shown) is provided on the surface of substrate 1 prior to the coating 150 being formed, with the pattern being located in areas which are ultimately to be free of coating 150. After the pattern is formed, a coating 150 is continuously formed across the entire or substantially the entire surface of substrate 1 over the pattern. The pattern can then be removed (along with the portions of coating 150 located directly over it) in order to create a patterned coating 150, so that the coating 150 remains on only the portions of the substrate where the original pattern was not deposited. Thus, a patterned coating 150 can be formed in such a manner in example embodiments of this invention. The remaining patterned coating 150 is substantially invisible to human eyes, but is visible to bird eyes as explained above.

As shown in FIG. 1, IG units which have two glass substrates 1 and 30 typically are characterized as having four surfaces. In particular, surface #1 faces the building exterior, surface #2 is the interior coated/uncoated surface of the same substrate 1 but faces the interior space/gap 7 of the IG unit, surface #3 is the interior coated/uncoated surface of the other substrate 30 facing the interior space/gap 17, and surface #4 faces the building interior. In the FIG. 1 embodiment, UV reflecting coating 150 is provided on surface #1 and the low-E coating 19 is provided on surface #2. This is a preferred arrangement of the coatings, as it enables much IR radiation to be blocked and much UV to be reflected before reaching space 17. However, in alternative embodiments of this invention, the positions of coatings 19 and 150 may be changed (e.g., coating 19 could be provided on surface #3).

The solar management coating 19 of the FIG. 1 embodiment may be a low-E coating in certain embodiments of this invention. In certain example embodiments, before and/or after optional heat treatment (e.g., thermal tempering and/or heat bending), the coating 19 in the FIG. 1 embodiment may have a sheet resistance ($R_s$) of no greater than 8 ohms/square, more preferably no greater than 6 ohms/square, and most preferably no greater than 4 ohms/square. In certain embodiments, the coating 19 may have an emissivity ($E_n$) after heat treatment of no greater than 0.10, more preferably no greater than 0.07, and even more preferably no greater than 0.05 (before and/or after optional heat treatment).

FIGS. 2-6 are cross sectional views of various UV reflecting coatings 150 that may be used on substrate 1 in the IG window unit of FIG. 1 in example embodiments of this invention. Glass substrate 1 may be soda-lime-silica based glass or any other suitable type of glass, and may be from about 1-10 mm thick, more preferably from about 2-6 mm thick, in example embodiments of this invention.

Figure 2:
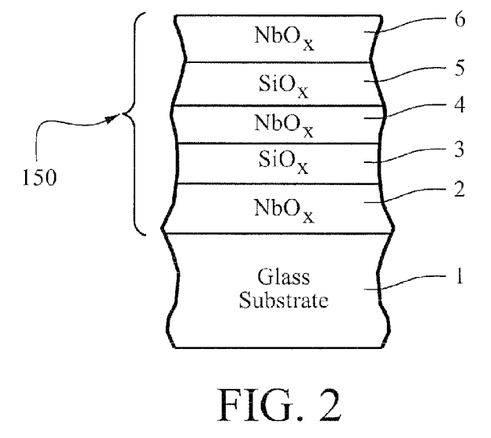
FIG. 2 is cross sectional view of a UV reflecting coating on a glass substrate, which may be used in the IG window unit of FIG. 1 according to example embodiments of this invention.

In the FIG. 1-2 embodiment, coating 150 includes high index transparent dielectric layers 2, 4 and 6 of or including niobium oxide (e.g., $Nb_2O_5$, $NbO_2$ and/or NbO) and low index transparent dielectric layers 3 and 5 of or including silicon oxide (e.g., $SiO_2$ which may or may not be doped with aluminum and/or nitrogen). Note that layer 6 in FIG. 2 is optional and can be removed to improve UV reflectance in certain instances, or can instead be of or including zirconium oxide. In certain example embodiments, one or both of the silicon oxide layers 3 and/or 5 may be doped with other material such as from about 1-8% aluminum and/or from about 1-10% nitrogen. One or more of layers 2, 4 and 6 may also be doped with other material in certain example instances. In the FIG. 2 embodiment, layer 6 is the outermost layer of the coating 150 and may be exposed to air. Each of layers 2-6 is considered "transparent" to visible light because each of these layers, standing alone, is substantially transparent to visible light (e.g., at least about 50% transparent, more preferably at least about 60% or 70% transparent to visible light). High index transparent dielectric layers 2, 4 and 6 of or including niobium oxide may have a refractive index (n) of from about 2.15 to 2.5, more preferably from about 2.2 to 2.4, and most preferably from about 2.25 to 2.35 (at 550 nm). In certain alternative embodiments, the niobium oxide may be replaced with titanium oxide (e.g., $TiO_2$), zirconium oxide, hafnium oxide (e.g., $HfO_2$), cerium oxide (e.g., $CeO_2$), zinc sulfide, or bismuth oxide (e.g., $Bi_2O_3$) in one or more of high index layers 2, 4 and/or 6. Thus, in one such example, layer 6 may be of or including titanium oxide, while layers 2 and 4 are of or including niobium oxide, and layers 3 and 5 are of or including silicon oxide. Low index transparent dielectric layers 3 and 5 of or including silicon oxide may have a refractive index (n) of from about 1.4 to 1.7, more preferably from about 1.4 to 1.6, and most preferably from about 1.45 to 1.55 (all refractive index n values herein are measured at 550 nm). Transparent dielectric layers 2-6 are preferably deposited by sputtering in example embodiments of this invention. For example, transparent dielectric layers 2, 4 and 6 of or including niobium oxide may be sputter deposited via at least one sputtering target of or including Nb, via sputtering in an atmosphere including a mixture of argon and reactive oxygen gases. And for example, transparent dielectric layers 3 and 5 of or including silicon oxide may be sputter deposited via at least one sputtering target of or including Si or SiAl, via sputtering in an atmosphere including a mixture of argon and reactive oxygen gases. Rotation C-Mag sputtering targets, or other types of targets, may be used. In sputtering operations, sufficient reactive oxygen gas may be used to achieve the refractive index values discussed herein. Ceramic targets may alternatively be used to sputter deposit one or more of these layers. While layers 2-6 are preferably deposited via sputtering, it is possible that they may be deposited via other techniques in alternative embodiments of this invention. While coating 150 consists of five layers in the FIG. 2 embodiment, it is possible that additional layers may be provided in alternative embodiments. For example, a protective layer of or including zirconium oxide (not shown) may be provided in the coating 150 as the uppermost layer over and directly contacting layer 6. Coating 150 in the FIG. 2 embodiment and in other example embodiments contains no metallic reflective layer.

Figure 3:
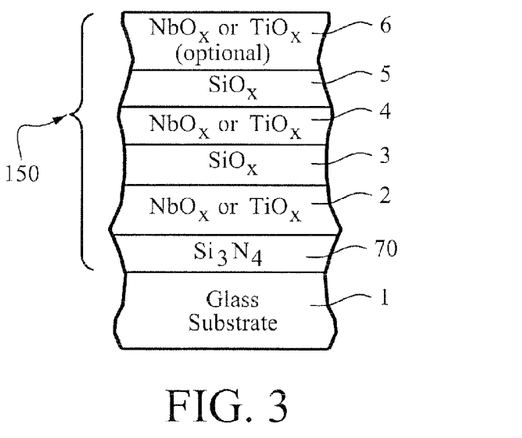
FIG. 3 is cross sectional view of another UV reflecting coating on a glass substrate, which may be used in the IG window unit of FIG. 1 according to example embodiments of this invention.

FIG. 3 is a cross sectional view of another coating 150 that may be used on substrate 1 in the FIG. 1 IG window unit. The FIG. 3 embodiment is the same as the FIG. 2 embodiment, except that transparent dielectric barrier layer 70 is provided between the glass substrate 1 and high index layer 2. Note that layer 6 in FIG. 3 is optional and can be removed to improve UV reflectance in certain instances, or can instead be of or including zirconium oxide. The barrier layer 70 is of or including silicon nitride (e.g., $Si_3N_4$) in certain example embodiments of this invention. Barrier layer 70 may optionally be used in the coatings of any of FIGS. 2-6, but is only shown in FIG. 3 for purposes of simplicity. In certain example embodiments, silicon nitride based barrier layer 70 may be doped with other material such as from about 1-8% aluminum and/or from about 1-10% oxygen. The FIG. 3 embodiment is particular useful in heat treated (e.g., thermally tempered) embodiments, where the barrier layer 70 helps prevent or reduce migration of elements (e.g., Na) from the glass substrate into the coating during the high temperature heat treatment. Such heat treatment (e.g., thermal tempering) may include, for example heating the coated article in an oven or the like at temperature(s) of at least about 580 degrees C., more preferably of at least about 600 degrees C. The mirror of the FIG. 3 embodiment may or may not be heat treated (e.g., thermally tempered) in example embodiments of this invention.

Figure 4:
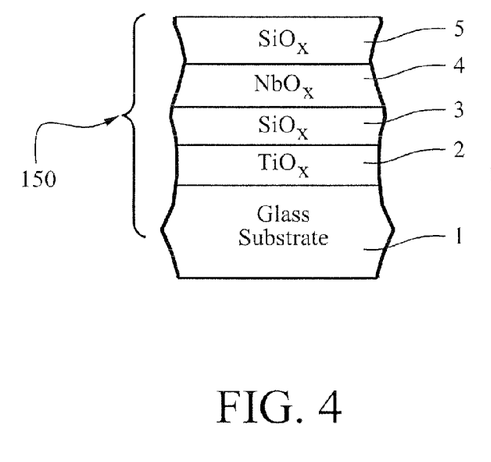
FIG. 4 is cross sectional view of another UV reflecting coating on a glass substrate, which may be used in the IG window unit of FIG. 1 according to example embodiments of this invention.

FIG. 4 is a cross sectional view of another coating 150 that may be used on substrate 1 in the FIG. 1 IG window unit. The FIG. 4 embodiment is the same as the FIG. 2 embodiment, except that layer 6 is removed. The coated article shown in FIG. 4 may have, for example, a film side UV reflectance of from about 40-45%, with an example being about 41% (reflecting at least this much UV radiation in at least a substantial part of the range from 300-400 nm). In an example of the FIG. 4 embodiment, layer 5 is the outermost layer of UV reflecting coating 150, and layer 2 is of or including titanium oxide (e.g., $TiO_2$), layer 3 is of or including silicon oxide (e.g., $SiO_2$ which may or may not be doped with aluminum and/or nitrogen), layer 4 is of or including niobium oxide (e.g., $Nb_2O_5$, $NbO_2$ and/or NbO), and layer 5 is of or including silicon oxide (e.g., $SiO_2$ which may or may not be doped with aluminum and/or nitrogen). Optionally, the coating of the FIG. 4 embodiment may also include an overcoat of or including zirconium oxide (e.g., $ZrO_2$). In certain example embodiments of the FIG. 4 embodiment of this invention: (i) transparent dielectric layer 2 of or including titanium oxide may be from about 5-40 nm thick, more preferably from about 10-25 nm thick, even more preferably from about 10-20 nm thick, with an example thickness being from about 13-16 nm; (ii) transparent dielectric layer 3 of or including silicon oxide may be from about 30-100 nm thick, more preferably from about 40-80 nm thick, even more preferably from about 50-70 nm thick, with an example thickness being about 60 nm; (iii) transparent dielectric layer 4 of or including niobium oxide may be from about 15-150 nm thick, more preferably from about 20-125 nm thick, even more preferably from about 95-120 nm thick, with an example thickness being about 33 nm or about 105 nm; (iv) transparent dielectric layer 5 of or including silicon oxide may be from about 40-130 nm thick, more preferably from about 50-110 nm thick, even more preferably from about 60-100 nm thick, with example thickness being about 60 nm or about 90 nm; and (v) optional transparent overcoat protective dielectric layer 8 of or including zirconium oxide may be from about 5-60 nm thick, more preferably from about 5-30 nm thick, even more preferably from about 5-20 nm thick, with an example thickness being about 10 nm. To realize the desired UV reflectance and visible transmission values herein, niobium oxide based layer 4 is preferably substantially thicker than titanium oxide based layer 2. For example, in certain example embodiments, niobium oxide based layer 4 is at least about 40 nm thicker (more preferably at least about 50 nm thicker, and most preferably at least about 70 nm thicker) than titanium oxide based layer 2. Moreover, niobium oxide based layer 4 is also preferably thicker than each of layers 3 and 5, for example layer 4 being at least about 10 nm thicker and most preferably at least about 15 nm thicker than each of silicon oxide based layers 3 and 5. Silicon oxide based layer 5 is at least about 10 or 20 nm thicker than is silicon oxide based layer 3 in certain embodiments of the FIG. 1, 4 embodiment of this invention. Optionally, a protective layer (not shown) of or including zirconium oxide may be provided as the outermost layer over layer 5 in the FIG. 4 coating (similar to the protective outer layer in FIG. 5).

Figure 5:
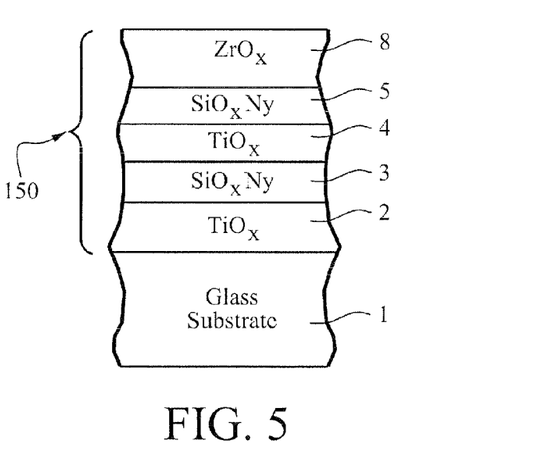
FIG. 5 is cross sectional view of yet another UV reflecting coating on a glass substrate, which may be used in the IG window unit of FIG. 1 according to example embodiments of this invention.

FIG. 5 is a cross sectional view of another coating 150 that may be used on substrate 1 in the FIG. 1 IG window unit. The coated article shown in FIG. 5 may have, for example, a film side UV reflectance of from about 60-70%, with an example being about 65% (reflecting at least this much UV radiation in at least a substantial part of the range from 300-400 nm). In an example of the FIG. 5 embodiment, layer 2 is of or including titanium oxide (e.g., $TiO_2$), layers 3 and 5 are of or including silicon oxynitride (e.g., which may or may not be doped with aluminum), layer 4 is of or including titanium oxide (e.g., $TiO_2$), and outermost protective layer 8 is of or including zirconium oxide (e.g., $ZrO_2$). In certain example embodiments of the FIG. 5 embodiment of this invention: (i) transparent dielectric layer 2 of or including titanium oxide may be from about 5-40 nm thick, more preferably from about 10-25 nm thick, even more preferably from about 10-20 nm thick, with an example thickness being about 17 nm; (ii) transparent dielectric layer 3 of or including silicon oxynitride may be from about 30-100 nm thick, more preferably from about 40-80 nm thick, even more preferably from about 45-70 nm thick, with an example thickness being about 50 nm; (iii) transparent dielectric layer 4 of or including titanium oxide may be from about 10-80 nm thick, more preferably from about 15-50 nm thick, even more preferably from about 20-40 nm thick, with an example thickness being about 30 nm; (iv) transparent dielectric layer 5 of or including silicon oxynitride may be from about 50-130 nm thick, more preferably from about 70-120 nm thick, even more preferably from about 80-110 nm thick, with an example thickness being about 88 nm; and (v) transparent dielectric protective layer 8 of or including zirconium oxide may be from about 3-30 nm thick, more preferably from about 4-10 nm thick, with an example thickness being about 7 nm. To realize the desired UV reflectance and visible transmission values herein, layer 4 is preferably substantially thicker than titanium oxide based layer 2. For example, in certain example embodiments, titanium oxide based layer 4 is at least about 8 nm thicker (more preferably at least about 10 nm thicker, and most preferably at least about 15 nm thicker) than titanium oxide based layer 2. And silicon oxynitride based layer 5 is at least about 10, 20 or 30 nm thicker than is silicon oxynitride based layer 3 in certain embodiments of the FIG. 1, 5 embodiment of this invention.

Figure 6:
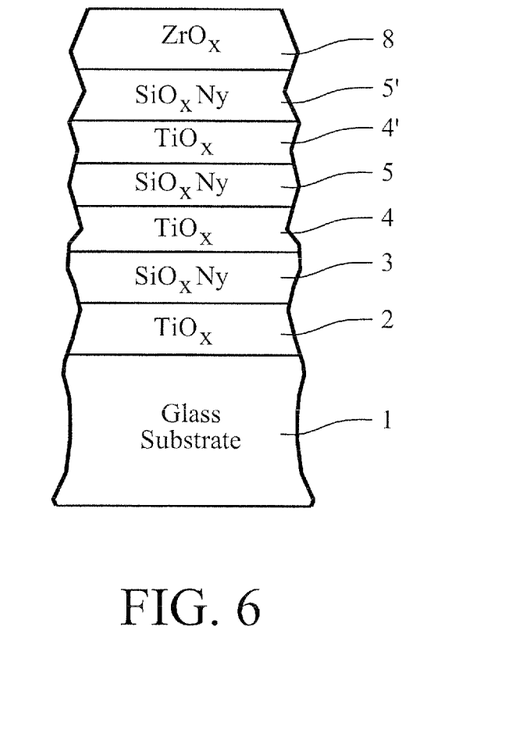
FIG. 6 is cross sectional view of yet another UV reflecting coating on a glass substrate, which may be used in the IG window unit of FIG. 1 according to example embodiments of this invention.

FIG. 6 is a cross sectional view of another coating 150 that may be used on substrate 1 in the FIG. 1 IG window unit. The coated article shown in FIG. 6 may have, for example, a film side UV reflectance of from about 50-80%, with an example being about 70% (reflecting at least this much UV radiation in at least a substantial part of the range from 300-400 nm). In an example of the FIG. 6 embodiment, layers 2, 4 and 4' are of or including titanium oxide (e.g., $TiO_2$), and layers 3, 5 and 5' are of or including silicon oxynitride (e.g., which may or may not be doped with aluminum), and outermost protective layer 8 is of or including zirconium oxide (e.g., $ZrO_2$). In certain example embodiments of the FIG. 6 embodiment of this invention: (i) transparent dielectric layer 2 of or including titanium oxide may be from about 5-40 nm thick, more preferably from about 10-25 nm thick, even more preferably from about 10-20 nm thick, with an example thickness being about 11 nm; (ii) transparent dielectric layer 3 of or including silicon oxynitride may be from about 30-100 nm thick, more preferably from about 40-80 nm thick, even more preferably from about 45-70 nm thick, with an example thickness being about 63 nm; (iii) transparent dielectric layer 4 of or including titanium oxide may be from about 10-80 nm thick, more preferably from about 15-50 nm thick, even more preferably from about 20-40 nm thick, with an example thickness being about 37 nm; (iv) transparent dielectric layer 5 of or including silicon oxynitride may be from about 10-70 nm thick, more preferably from about 15-60 nm thick, even more preferably from about 20-40 nm thick, with an example thickness being about 32 nm; (v) transparent dielectric layer 4' of or including titanium oxide may be from about 10-80 nm thick, more preferably from about 15-50 nm thick, even more preferably from about 20-40 nm thick, with an example thickness being about 33 nm; (vi) transparent dielectric layer 5' of or including silicon oxynitride may be from about 50-130 nm thick, more preferably from about 70-120 nm thick, even more preferably from about 80-110 nm thick, with an example thickness being about 100 nm; and (vii) transparent dielectric protective layer 8 of or including zirconium oxide for mechanical durability may be from about 3-30 nm thick, more preferably from about 4-10 nm thick, with an example thickness being about 5 nm. To realize the desired UV reflectance and visible transmission values herein, high index layers 4 and 4' are preferably substantially thicker than high index layer 2. For example, in certain example embodiments, titanium oxide based layers 4 and 4' may be at least about 8 nm thicker (more preferably at least about 10 nm thicker, and most preferably at least about 15 nm thicker) than high index titanium oxide based layer 2. And silicon oxynitride based layer 5' is at least about 10, 20 or 30 nm thicker than are silicon oxynitride based layers 3 and/or 5 in certain embodiments of the FIG. 1, 6 embodiment of this invention. In the FIG. 5-6 embodiments, the silicon oxynitride based layers 3, 5 and 5' may have a refractive index n (measured at 550 nm) of from about 1.6 to 1.8, more preferably from about 1.65 to 1.75, and most preferably 1.7. The FIG. 5-6 embodiments are also surprisingly advantageous in that their optical properties have been found to be close to that of uncoated float glass, which makes the coatings 150 essentially invisible to human eyes.

In example embodiments of this invention, there is provided an IG window unit comprising: a first glass substrate; a second glass substrate spaced apart from the first glass substrate; a UV reflecting coating provided on the first glass substrate and on an exterior surface of the IG window unit so as to face an exterior of a building in which the IG window unit is to be mounted; a low-E coating provided on the other side of the first glass substrate, so that the first glass substrate supports and is located between the UV reflecting coating and the low-E coating; wherein the UV reflecting coating is not part of a low-E coating and does not contain any IR reflecting layer of silver or gold; wherein the UV reflecting coating is patterned so that the UV reflecting coating is not provided continuously across the entire first substrate; wherein the UV reflecting coating comprises first, second, third, and fourth layers in this order moving away from the first glass substrate, and wherein the first and third layers are high index layers having a refractive index of at least about 2.25 and the second and fourth layers are low index layers having a refractive index of no greater than 1.8, where refractive indices are measured at 550 nm; wherein the first, second, third and fourth layers are each dielectric layers that are substantially transparent to visible light; and wherein the IG window unit has a visible transmission of at least about 50%, and the UV reflecting coating reflects at least 40% of UV radiation in at least a substantial part of the range from 300-400 nm.

In the IG window unit of the immediately preceding paragraph, the UV reflecting coating may reflect at least 50% of UV radiation in at least a substantial part of the range from 300-400 nm.

In the IG window unit of any of the preceding two paragraphs, the UV reflecting coating may reflect at least 60% of UV radiation in at least a substantial part of the range from 300-400 nm.

In the IG window unit of any of the preceding three paragraphs, the low-E coating may comprise first and second IR blocking layers each comprising Ag, at least one dielectric layer provided between the first IR blocking layer and the first substrate, at least another dielectric layer provided between the first and second IR blocking layers, and wherein the low-E coating supported by the first substrate has an emissivity ($E_n$) of no greater than 0.10 and/or a sheet resistance ($R_s$) of no greater than 8 ohms/square.

In the IG window unit of any of the preceding four paragraphs, the first and second glass substrates may be spaced apart from one another by at least one spacer and/or edge seal so as to define a space between the substrates. The space between the substrates may be filled with a gas and/or is evacuated to a pressure less than atmospheric.

In the IG window unit of any of the preceding five paragraphs, the first layer may comprise or consist essentially of titanium oxide such as $TiO_2$ (or optionally niobium oxide).

In the IG window unit of any of the preceding six paragraphs, the third layer may comprise or consist essentially of titanium oxide (or optionally niobium oxide).

In the IG window unit of any of the preceding seven paragraphs, the second layer may comprise or consist essentially of silicon oxide.

In the IG window unit of any of the preceding eight paragraphs, the fourth layer may comprise or consist essentially of silicon oxide.

In the IG window unit of any of the preceding nine paragraphs, the second and/or fourth layer(s) may comprise or consist essentially of silicon oxynitride.

In the IG window unit of any of the preceding ten paragraphs, the UV reflecting coating may further comprise a protective layer comprising zirconium oxide that is an outermost layer of the UV reflecting coating.

In the IG window unit of any of the preceding eleven paragraphs, the UV reflecting coating may further comprise a fifth layer and a sixth layer moving away from the first glass substrate, the fifth layer being a low index layer and the sixth layer being a high index layer.

In the IG window unit of any of the preceding twelve paragraphs, the first layer may have a physical thickness of from about 10-25 nm.

In the IG window unit of any of the preceding thirteen paragraphs, the second layer may have a physical thickness of from about 40-80 nm.

In the IG window unit of any of the preceding fourteen paragraphs, the third layer may have a physical thickness of 15-50 nm.

In the IG window unit of any of the preceding fifteen paragraphs, the fourth layer may have a physical thickness of from about 70-120 nm.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An IG window unit comprising:
   a first glass substrate;
   a second glass substrate spaced apart from the first glass substrate via at least one spacer so as to provide an air space between the first and second glass substrates, said air space optionally comprising an inert gas;
   a UV reflecting coating provided on the first glass substrate and on an exterior surface of the IG window unit so as to face an exterior of a building in which the IG window unit is to be mounted;
   a low-E coating comprising at least one IR reflecting layer comprising silver provided on the other side of the first glass substrate, so that the first glass substrate supports and is located between the UV reflecting coating and the low-E coating;
   wherein the UV reflecting coating is not part of a low-E coating and does not contain any IR reflecting layer of silver or gold;
   wherein the UV reflecting coating is patterned so that the UV reflecting coating is not provided continuously across the entire first substrate;
   wherein the UV reflecting coating comprises first, second, third, and fourth layers in this order moving away from the first glass substrate, and wherein the first and third layers are high index layers having a refractive index of at least 2.25 and the second and fourth layers are low index layers having a refractive index of no greater than 1.8, where refractive indices are measured at 550 nm;
   wherein the first, second, third and fourth layers are each dielectric layers that are substantially transparent to visible light; and
   wherein the IG window unit has a visible transmission of at least 50%, and the UV reflecting coating reflects at least 40% of UV radiation in at least a substantial part of the range from 300-400 nm.

2. The IG window unit of claim 1, wherein the UV reflecting coating reflects at least 50% of UV radiation in at least a substantial part of the range from 300-400 nm.

3. The IG window unit of claim 1, wherein the UV reflecting coating reflects at least 60% of UV radiation in at least a substantial part of the range from 300-400 nm.

4. The IG window unit of claim 1, wherein the low-E coating comprises first and second IR reflecting layers each comprising Ag, at least one dielectric layer provided between the first IR reflecting layer and the first substrate, at least another dielectric layer provided between the first and second IR reflecting layers, and wherein the low-E coating supported by the first substrate has an emissivity ($E_n$) of no greater than 0.10 and/or a sheet resistance ($R_s$) of no greater than 8 ohms/square.

5. The IG window unit of claim 1, wherein the first and second glass substrates are spaced apart from one another by at least one spacer and/or edge seal so as to define a space between the substrates.

6. The IG window unit of claim 5, wherein the space between the substrates is filled with a gas and/or is evacuated to a pressure less than atmospheric.

7. The IG window unit of claim 1, wherein the first layer comprises titanium oxide.

8. The IG window unit of claim 1, wherein the third layer comprises titanium oxide.

9. The IG window unit of claim 1, wherein the second layer comprises silicon oxide.

10. The IG window unit of claim 1, wherein the fourth layer comprises silicon oxide.

11. The IG window unit of claim 1, wherein the second layer comprises silicon oxynitride.

12. The IG window unit of claim 1, wherein the fourth layer comprises silicon oxynitride.

13. The IG window unit of claim 1, wherein the UV reflecting coating further comprises a protective layer comprising zirconium oxide that is an outermost layer of the UV reflecting coating.

14. The IG window unit of claim 1, wherein the UV reflecting coating further comprises a fifth layer and a sixth layer moving away from the first glass substrate, the fifth layer being a low index layer and the sixth layer being a high index layer.

15. The IG window unit of claim 1, wherein the first layer has a physical thickness of from about 10-25 nm.

16. The IG window unit of claim 1, wherein the second layer has a physical thickness of from about 40-80 nm.

17. The IG window unit of claim 1, wherein the third layer has a physical thickness of 15-50 nm.

18. The IG window unit of claim 1, wherein the fourth layer has a physical thickness of from about 70-120 nm.

19. The IG window unit of claim 1, wherein in the UV reflecting coating the first layer comprises an oxide of titanium, the second layer comprises an oxide of silicon, the third layer comprising an oxide of niobium, and the fourth layer comprises an oxide of silicon.

20. The IG window unit of claim 19, wherein the UV reflecting coating further comprises a protective overcoat layer comprising zirconium oxide.

21. The IG window unit of claim 19, wherein the first layer is from about 5-40 nm thick, the second layer is from about 30-100 nm thick, the third layer is from about 15-150 nm thick, and the fourth layer is from about 40-130 nm thick.

22. The IG window unit of claim 21, wherein the first layer is from about 10-25 nm thick, the second layer is from about 40-80 nm thick, the third layer is from about 20-125 nm thick, and the fourth layer is from about 50-110 nm thick.

* * * * *